United States Patent
Wildner

[15] 3,703,258
[45] Nov. 21, 1972

[54] THRUST REVERSER UNIT
[72] Inventor: Walter Wildner, Munich, Germany
[73] Assignee: Motoren-und Turbinen-Union Munchen GmbH, Munich, Germany
[22] Filed: Dec. 23, 1970
[21] Appl. No.: 100,889

[30] Foreign Application Priority Data
Dec. 24, 1969 Germany..........P 19 64 976.4

[52] U.S. Cl. ....239/265.29, 239/265.31, 239/265.39
[51] Int. Cl..............................................B64c 15/06
[58] Field of Search........239/265.29, 265.31, 265.39

[56] References Cited

UNITED STATES PATENTS

| | | |
|---|---|---|
| 2,955,418 | 10/1960 | David et al........239/265.31 X |
| 3,403,858 | 10/1968 | Kurti et al.............239/265.39 |
| 3,347,467 | 10/1967 | Carl et al..............239/265.31 |
| 2,976,676 | 3/1961 | Kress..............239/265.39 UX |

FOREIGN PATENTS OR APPLICATIONS

| | | |
|---|---|---|
| 1,054,848 | 4/1959 | Germany..............239/265.31 |
| 1,287,444 | 1/1969 | Germany..............239/265.31 |

*Primary Examiner*—M. Henson Wood, Jr.
*Assistant Examiner*—Reinhold W. Thieme
*Attorney*—Craig, Antonelli, Stewart & Hill

[57] ABSTRACT

A thrust reversing device shutting-off the gas flow supplied by a turbojet engine and directing it to cascade vane assemblies extended from an engine fairing. An axially movable cylinder is provided with a variable thrust nozzle on its downstream end with recesses containing the reversing cascade vane assemblies. For an increased exhaust area, one or several tapering sections of a nozzle actuating skirt located downstream and generally following the engine fairing contour can be moved into recesses of nozzle flaps pivotable about transverse axes. For the reversing position, the cylinder with the reversing cascade vane assemblies is extended from the engine fairing over the end of the afterburner jet pipe, with the horizontal gas flow path by shut-off simultaneously by flaps of the variable thrust nozzle, which flaps are pivotable about transverse axes and form the divergent inner section of the thrust nozzle when the reversing device is in forward thrust position.

25 Claims, 5 Drawing Figures

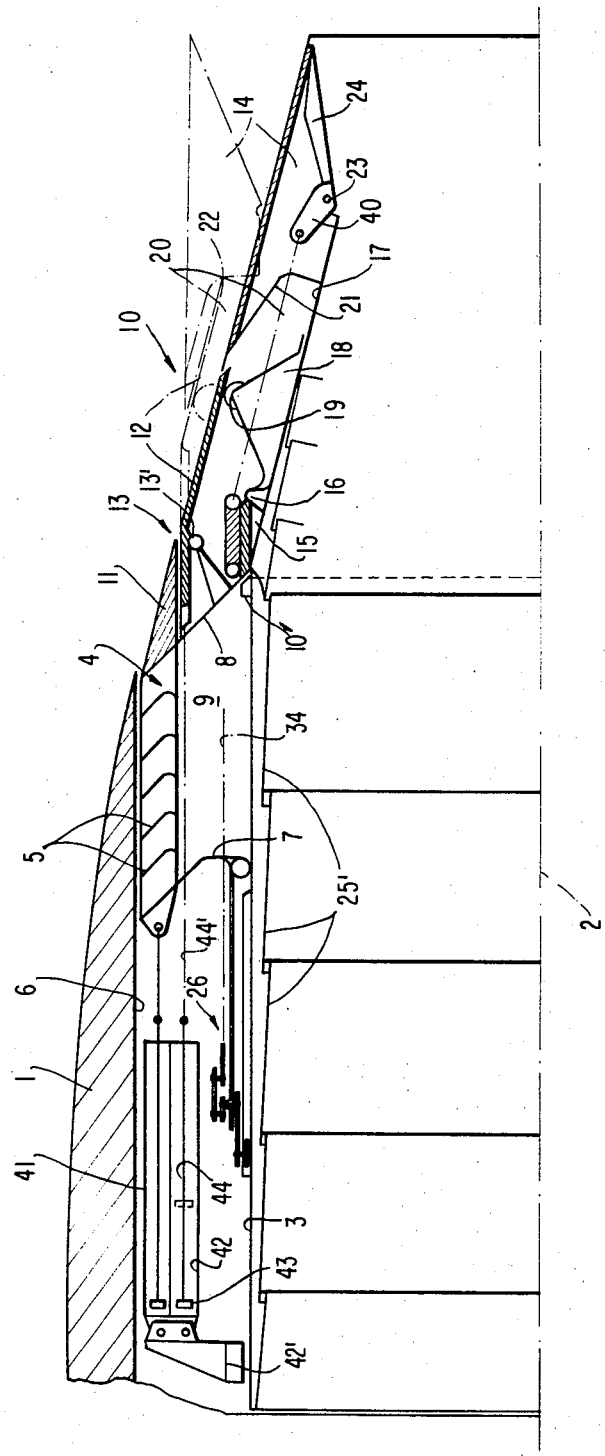

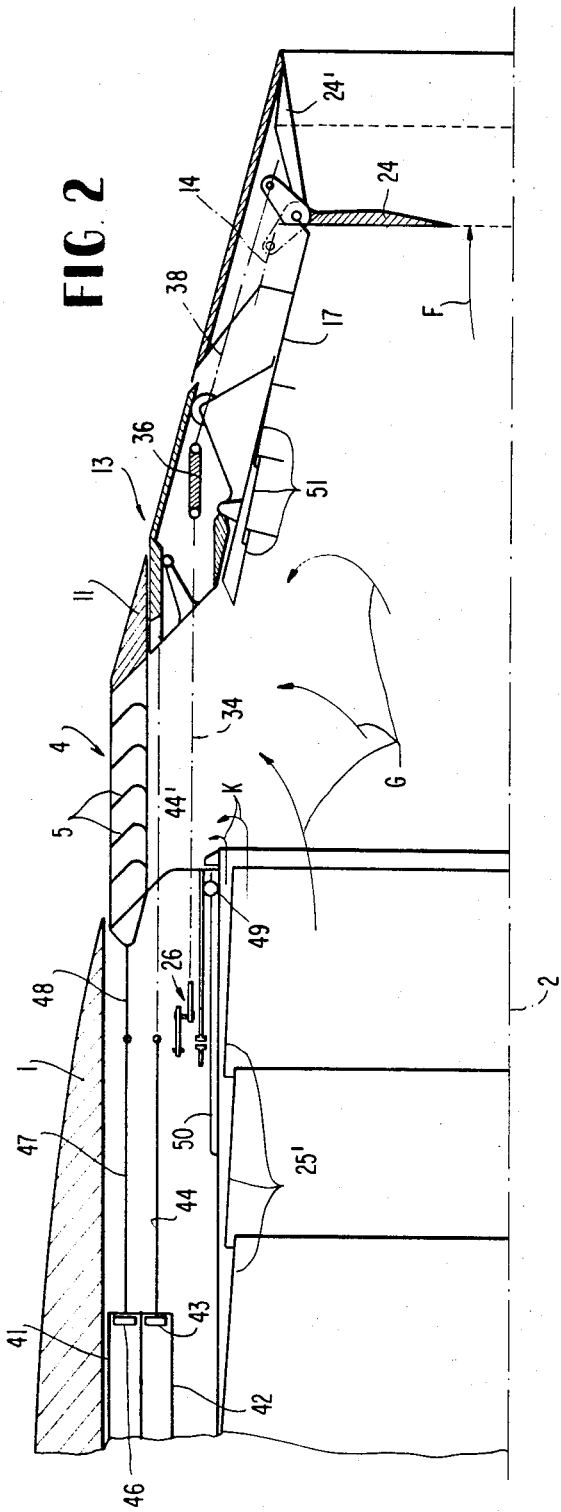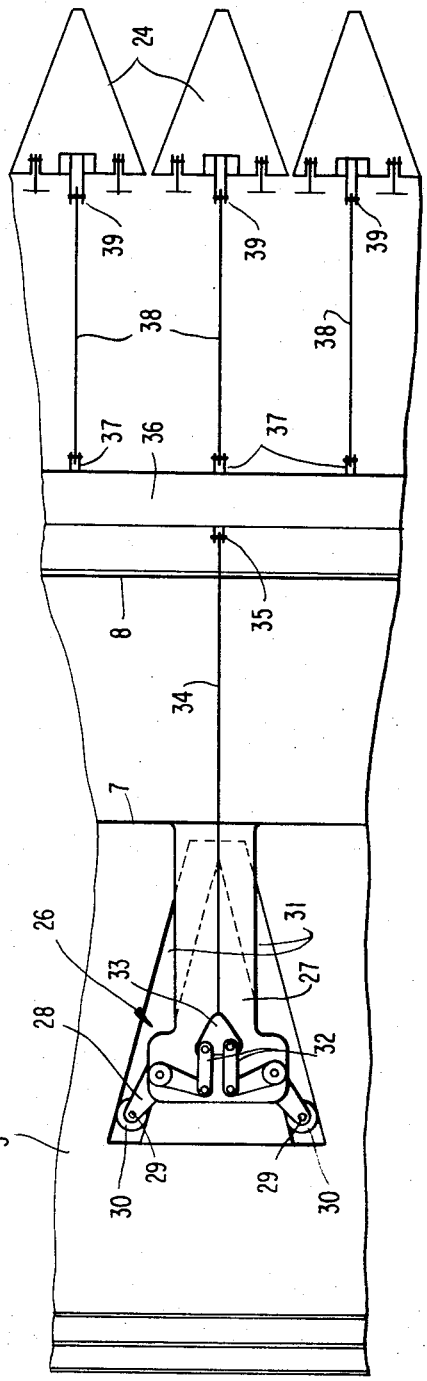

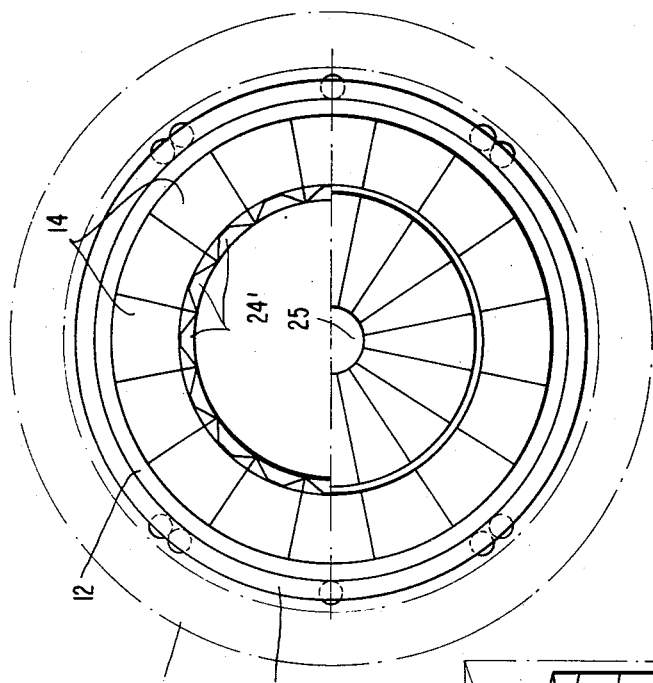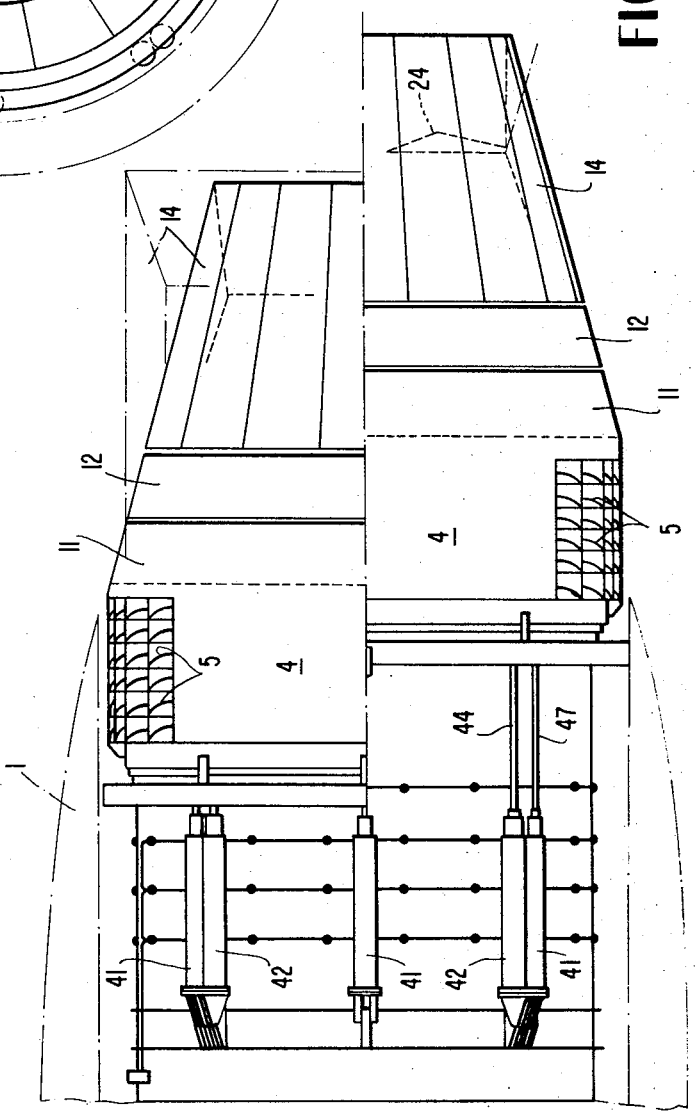

THRUST REVERSER UNIT

BACKGROUND OF THE INVENTION

The present invention relates to a thrust reverser unit with devices which shut-off the gas flow supplied by a turbojet engine and thus direct it to cascade vane assemblies when the latter are extended from an engine fairing. The present invention is particularly suited for a turbojet engine featuring an afterburner jet pipe followed by a variable thrust nozzle.

In modern high-speed aircraft, a reduction of the landing distance is achieved by re-directing the jet efflux or exhaust which normally serves for the propulsion of the aircraft in the forward direction so that the aircraft is decelerated. In prior art systems, two different methods were presented to solve this problem. The first system utilized only part of the gas efflux, and the second system utilized the total gas efflux which was redirected in the forward direction. There are thrust reversing devices which redirect bypass air only in order to achieve a decelerating effect. The maximum decelerating effect and, thus, the minimum landing distance, however, are achieved only when the whole jet efflux can be redirected in the forward direction.

The present invention is based upon a solution presented in German Pat. specification 1 187 491, wherein the bypass air flow of an engine can be redirected in the forward direction by means of a cascade vane assembly extendable from the engine fairing with the cascade vane assembly progressively closing a bypass duct diverging in the flow direction so that a progressively increasing amount of bypass air is imparted to the deflecting cascade vane assembly. With this arrangement, however, only the bypass air flow supplied by the LP compressor of the associated engine can be redirected.

The problems for which a solution in accordance with the present invention is presented herein are encountered when it is desired to redirect the whole gas efflux or exhaust supplied by the engine in the forward direction for decelerating the aircraft, in particular in the case of a turbojet engine featuring an afterburner for which a variable thrust nozzle is required so that the nozzle area can be adapted to the increased gas volume during afterburner operation. Engines featuring an afterburner are generally equipped with an afterburner jet pipe disposed adjacent to the engine downstream of the last turbine stage. As a protection against the high temperatures during afterburner operation, the afterburner jet pipe is generally lined with a heat shield which is cooled both inside and outside by bleed air from the engine compressor. Thus, the jet pipe is protected from overheating and from wear which might result therefrom.

The problem resulting from these considerations is where to locate the thrust reversing device on an engine featuring the above-described devices so that the whole gas efflux or exhaust supplied by the engine can be redirected in the forward direction for decelerating the aircraft. In a solution described in German Pat. specification 1 145 090, it has been suggested to dispose a thrust reversing device immediately downstream of the turbine gas outlet of an engine. This thrust reversing device features eyelid-type doors pivotable about a transverse axis which, in one end position, i.e. forward thrust, close cascade vane assemblies located in the engine fairing, and which, in a second end position, i.e. thrust reversing, shut off the gas efflux or exhaust flowing horizontally rearwards through a jet pipe, which normally provides the propulsive force for the aircraft, by swivelling them into a position where the gas flow supplied by the engine is directed to the reversing cascade vane assemblies only. A disadvantage of this solution, however, resides in that the engine fairing must have openings for the reversing cascade vane assemblies fitted therein, which openings reduce the stability of the engine fairing and moreover result in high manufacturing costs. This also applies to the associated engine jet pipe, the wall sections of which are formed by the eyelid-type doors within the section of the thrust reversing device (forward thrust), which again requires doors manufactured to close tolerances to achieve effective sealing of the jet pipe. Moreover, the jet pipe no longer forms an integral and rigid unit due to the doors.

Considering that, in the case of this known solution, the engine must be located in the tail of the aircraft, i.e., so that the thrust nozzle associated with the engine approximately coincides with the fuselage tail, then the above-described thrust reversing device would have to be located in a fuselage section of relatively large diameter. This arrangement would result in relatively large reversing doors, therefore requiring great operating forces. When in this known arrangement an afterburning means for the engine exhaust gases would additionally be provided within the jet pipe, it would be possible to locate the forward end of the flame zone resulting upon selection of afterburner operation already within the section of the thrust reversing device or upstream of it. With this arrangement, however, there is a risk that, due to the high temperatures resulting from afterburner operation, particularly after an extended operating period, the actuating mechanism becomes inoperative.

As a solution to this problem, it is proposed to locate the forward end of the combustion zone, resulting upon selection of afterburner operation, downstream of the reversing doors within the jet pipe. This, however, requires an extension of the jet pipe downstream of the thrust reversing device by an amount at least equivalent to the afterburning flame zone with the additional length of the variable geometry thrust nozzle mounted to the jet pipe. The above solution would result in a power plant of considerable length and thus in additional weight which could only be compensated for by increased engine power.

In an earlier solution presented in U.S. Pat. application, Ser. No. 40,763, filed May 27, 1970, it was proposed to dispose a thrust reversing device in the afterburner jet pipe section of an engine in such a manner that the flame zone existing during afterburner operation can start upstream of the thrust reversing devices. In this arrangement, the engine fairing is provided with outlets which can be opened for thrust reversal by simultaneous operation of the outer and inner doors, with the inner doors consisting of triangular sectors forming part of the jet pipe wall and its heat shield which simultaneously shut off the horizontal gas flow to the jet pipe when the outlets in the engine fairing are progressively opened. With this arrangement proposed in the earlier invention, a power plant of relatively short length and relatively low weight was provided, although including a thrust reversing device and an afterburner. Moreover, the thrust reversing device is located at a point where the diameter of the power plant and engine fairing is relatively small but also, in this case, the stability of the fairing is reduced by the outlets provided therein. In addition, the openings in the jet pipe and heat shield for swivelling the inner doors in and out reduce the stability of these components and result in relatively high manufacturing costs, since the inner doors forming sectors of jet pipe wall and heat shield must fit accurately into the relevant outlets for effective sealing when swung into forward thrust position.

SUMMARY OF THE INVENTION

It is an aim of the present invention to avoid the disadvantages of the above-described engine thrust reversing devices as well as the disadvantages described in connection with the earlier patent specification.

It is also an aim of the present invention to provide a thrust reversing device which in the case of an engine fitted with an afterburner, i.e., afterburner jet pipe and the associated variable thrust nozzle, can be integrated into the power plant and the relevant engine fairing so that the length of the power plant is kept at a minimum resulting in reduced power plant weight.

Moreover, it is an object of the present invention to maintain the stability of engine fairing, afterburner jet pipe and the associated heat shield and to avoid any modifications of the afterburner jet pipe and the associated heat shield as would be required due to the thrust reversing device in arrangements of the prior art.

Another objective of the present invention is to minimize flow losses at the fuselage tail which are caused by a thrust reversing device and a variable thrust nozzle, particularly in the forward thrust position.

The foregoing problems and disadvantages have been solved in accordance with the present invention by the provision of an axially movable cylinder provided with a variable thrust nozzle on its downstream end with recesses containing reversing cascade vane assemblies. With the thrust reversing device in an inoperative position, the cylinder is retracted into the engine fairing over the afterburner jet pipe. For the reversing position, the cylinder with the reversing cascade vane assemblies is extended from the fairing over the end of the stationary jet pipe with the horizontal gas flow path being shut-off simultaneously by means of the flaps of the variable nozzle, which flaps are pivotable about transverse and which form the divergent inner section of the thrust nozzle when the reversing device is in forward thrust position. Another feature of the present invention are rollers mounted to the afterburner jet pipe supporting the actuating cylinder which thus is axially movable thereon.

In conjunction with a thrust nozzle according to U.S. application, Ser. No. 55,702, filed July 17, 1970 where, for an increased exhaust area, one or several tapering sections of a nozzle actuating skirt disposed downstream and generally following the contour of the engine fairing can be moved into the recesses of nozzle flaps pivotable about transverse axes and where furthermore, in the position of the minimum nozzle sectional area, the inner slide faces associated with the recesses of the nozzle flaps for the retraction motion of the nozzle actuating skirt sections, tapering in a downstream direction, are inclined inwards at a greater angle than that of the taper of the actuating skirt, a further feature of the present invention resides in that the actuating cylinder with the thrust reversing device in the inoperative position is arranged between the engine fairing and the actuating skirt associated with the thrust nozzle with an end section tapering at the same angle as the fairing so that the actuating skirt can be extended from the actuating cylinder for increasing the nozzle sectional area. Still another feature of the present invention consists in that the flaps can be operated through actuating devices controlled by the axial movement of the actuating cylinder in a manner so that with a progressive increase of the exhaust area of all thrust reversing cascade vane assemblies, the thrust nozzle sectional area progressively decreases or vice versa.

Another feature of the present invention consists in that each actuating device can be provided with a support connected to the actuating cylinder and carrying pivotably mounted bellcrank levers which slide in stationary guideways which are inclined relatively to each other and are straight or curved configuration with rollers at one end and which, at their other end, have a pair of levers acting upon a rod through a common connecting link which again is provided with an actuating ring for the operation of the flaps. Another feature of the present invention consists in that the actuating ring and the actuating rods between the ring and the flaps are arranged between the lower wall sections of the nozzle flaps protected by heat shields and the nozzle actuating skirt and upper wall sections of the nozzle flaps.

BRIEF DESCRIPTION OF THE DRAWING

These and further aims, features and advantages of the present invention will become more apparent from the following description when taken in conjunction with the accompanying drawing which shows, for purposes of illustration only, an embodiment in accordance with the present invention and wherein:

FIG. 1 is a longitudinal center section of the upper half of a thrust reversing device in accordance with the present invention with a variable thrust nozzle at the end of an engine fairing shown in broken lines including an afterburner jet pipe section with the thrust reverser unit in an inoperative position;

FIG. 2 is a longitudinal center view of the thrust reversing device shown in FIG. 1 in the operating position;

FIG. 3 is a control system for actuating the flaps associated with the thrust reversing device;

FIG. 4 is a side view of the thrust reversing device and the associated operating means on a common afterburner jet pipe and at the end of an engine fairing indicated by broken lines, showing two end positions of the thrust reversing device; and FIG. 5 is a rear view of the arrangement in FIG. 4 related to the two different end positions of the thrust reversing device.

DETAILED DESCRIPTION OF THE DRAWING

Referring now to the drawing and, in particular, to FIG. 1, there is shown an engine fairing 1 tapering towards the end at an acute angle with the fairing being arranged coaxially with the longitudinal center axis 2 of afterburner jet pipe 3. The thrust reversing device in accordance with the present invention essentially consists of an actuating cylinder 4 as shown, for example, in FIG. 4 arranged parallel to longitudinal center axis 2 of the afterburner jet pipe 3 and containing thrust reversing cascade vane assemblies 5.

In FIG. 1 and the top of FIG. 4 the actuating cylinder 4 is retracted into engine fairing 1 so that thrust reversing cascade vane assemblies 5 are completely covered by inner wall 6 of the engine fairing 1 and thus sealed against atmosphere as shown in FIG. 1. In the inoperative position of the thrust reversing device, thrust reversing cascade vane assemblies 5 are always located over the afterburner jet pipe 3; gas ducts 9 formed by wall sections 7, 8 leading to thrust reversing cascade vane assemblies 5 are sealed by afterburner jet pipe 3 and sealed additionally against the exhaust gas flow passing through the jet pipe 3 and then thrust nozzle 10 by the contact between the wall section 8 of each gas duct 9 and collar 10' at the end of the afterburner jet pipe 3, when the thrust reversing device is in inoperative position.

At the downstream end, the actuating cylinder 4 is fitted with an end section 11 tapering at the same angle as engine fairing 1. A streamlined extension of end section 11 is formed by another end section 12 tapering in the downstream direction of axially adjustable nozzle actuating skirt 13 which can only be extended in the axial direction from the actuating cylinder 4 on rollers 13' mounted to the cylinder for increasing the nozzle sectional area controlled by nozzle flaps 14 when the thrust reversing device is in the inoperative position (FIGS. 1 and 4). The position of the nozzle actuating skirt 13 of associated end section 12 and nozzle flaps 14 is shown by chain-dotted lines. Nozzle flaps 14 are pivotable about transverse axes 16 and are mounted to ring 15 which is rigidly connected to the actuating cylinder 4. Brackets 18 fitted to lower wall section 17 carry rollers 19 over which the end section 12 of nozzle actuating skirt 13 slides into recesses 20 of nozzle flaps 14 so that an increased area of the variable thrust nozzle 10 is obtained.

As can be seen from the position of nozzle flaps 14 shown in FIG. 1 and indicated by solid lines, in this nozzle flap end position which determines the minimum thrust nozzle sectional area, inner sliding faces 21 associated with the recesses 20 are inclined inwards at a greater angle than that of the taper of end section 12. Thus, the nozzle actuating skirt 13 which is extendable in the axial direction from actuating cylinder 4 can further slide and thus open nozzle flaps 14 with relevant edges 22 of the end section 12, thereby contacting the inner sliding faces 21 of the recesses 20 until they have reached the position shown in FIG. 1 and the top of FIG. 4 and indicated by the chain-dotted lines. For thrust reversing, the actuating cylinder 4 is extended from engine fairing 1 to a point where the thrust reversing cascade vane assemblies 5 have reached their end position as shown in FIG. 2 and the bottom of FIG. 4. The nozzle flaps 14 connected to the actuating cylinder 4 are also pushed out by its extending motion but remain in the end position which is required for obtaining the minimum thrust nozzle sectional area shown in FIG. 2.

With the progressive opening of the thrust reversing cascade vane assemblies 5 by the axial extension of actuating cylinder 4 from the engine fairing 1, flaps 24 swivelling about transverse axes 23 at the rear end of the nozzle flaps 14 simultaneously reduce the gas outlet area of the thrust nozzle 10 and, thus, progressively direct the jet efflux in the direction of the thrust reversing cascade vane assemblies 5. The flaps 24 can be of triangular section, as shown in FIG. 2, in the longitudinal direction as well as of triangular section in the transverse direction of FIG. 5 and can be swung out from associated recesses 24' of the nozzle flaps 14 for thrust reversal as shown in FIG. 2. With the thrust reversing device in the inoperative position of FIG. 1, the flaps 24 are completely swung into the recesses 24', thus forming the diverging end section of the thrust nozzle 10 and providing a smooth flow path for the jet efflux. In the thrust reversing position shown in FIG. 2, the bottom of FIG. 4, and the bottom of FIG. 5, the flaps 24 need not close the gas outlet section of the thrust nozzle 10 completely so that a small amount of the gases as indicated for example by arrows F in FIG. 2 which are supplied by the engine (not shown) can pass through a circular area 25 shown in FIG. 5 formed by all flaps 24 in their closed position even when reverse thrust is selected. As shown in FIG. 2, the engine gases leaving afterburner jet pipe 3 flow in the direction of arrow G while the air tapped from the engine (not shown) for the cooling afterburner jet pipe 3 and heat shield rings 25' flows in the direction of arrow K to the thrust reversing cascade vane assemblies 5.

FIG. 3 shows an actuating device 26 arranged above the afterburner jet pipe 3 for actuating the flaps 24 through the extension motion of the actuating cylinder 4 in a manner which ensures that the total gas outlet sectional area provided by the thrust reversing cascade vane assemblies 5 and/or by the flaps 24 in all intermediate positions and in the two end positions of the thrust reversing device remains constant. The actuating device 26, of which several of identical type can be equally spaced around the circumference of the afterburner jet pipe 3, is provided with support 27 connected to a duct wall 7 of the actuating cylinder 4 carrying pivotably mounted bellcrank levers 28 which slide, with their rollers 30 mounted at one end 29, in straight guideways 31 arranged in an inclined position relative to each other. The guideways can be fitted to the afterburner jet pipe 3. On the remaining free ends of bellcrank levers 28, a pair of levers 32 is mounted which acts upon rod 34 through a connecting link 33, which again is connected with an actuating ring 36 at joint 35. At joint 37 additional actuating rods 38 are connected with the actuating ring 36, which additional rods act upon actuating levers 30, shown in FIG. 1, of flaps 24 by joints 39.

With the above-described actuating device 26, the axial travel of the actuating ring 36 required for swivelling flaps 24 is much shorter than the travel of the actuating cylinder 4 for exposing the thrust reversing cascade vane assemblies 5. The guideways 31 of each actuating device 26 can be straight as described and shown in FIG. 3 but they may, however, also be of curved shape. The inclination of the guideways 31 relative to each other can be greater or smaller than shown in FIG. 3. The shape and inclination of these guideways are to be selected so that the total gas outlet sectional area always remains constant during the travel of the actuating cylinder 4 and the associated motion of the flaps 24. The actuating device 26 and the above-described devices for the actuation of the flaps 24 can be arranged in such a manner that actuating ring 36, contrary to FIG. 3, is not moved to the right when exposing the thrust reversing cascade vane assemblies 5 at the same time shutting off the horizontal gas flow through the thrust nozzle, but rather to the left where the rods 34 and the actuating rods 38 can then effect an adjustment of the flaps 24 under tension force for the thrust reverser operating case described.

As can further be seen from FIGS. 1, 2 and 4, two hydraulic or pneumatic rams 41, 42 are arranged in pairs for the axial adjustment of the actuating cylinder 4 and of the nozzle actuating skirt 13 and are connected to the outside of the afterburner jet pipe 3 via a common connecting link 42'. With the thrust reversing device in its inoperative position in FIG. 1, the nozzle flaps 14 of the thrust nozzle 10 can be actuated by the lower actuating rams 42 alone, wherein pistons 43 with piston rods 44 of the associated rams 42 are moved to the right, i.e., the position of the piston 43 shown by the broken line corresponding to the fully open position of nozzle flap 14 as shown by the chain-dotted line. Between each piston rod 44 and the nozzle actuating skirt 13, an actuating rod 44' is provided.

For the extension of actuating cylinder 4 with the thrust reversing cascade vane assemblies 5 from engine fairing 1, all rams 41, 42 arranged in pairs are simultaneously subjected to pressure by a synchronizing device (not shown). The pistons 43 and the piston rods 44 of rams 42 are then moved into the end position in accordance with FIG. 2, simultaneously with pistons 46 and piston rod 47 associated with the rams 41, each of which is connected to the actuating cylinder 4 via connecting link 48. In order to avoid that the actuating cylinder 4 is extended from the engine fairing 1 too rapidly due to the progressively increasing tensile forces acting upon the thrust reversing device, which tensile forces result from the progressively increasing amount of re-directed gases, it may be desirable to provide means for damping the piston movements, for example, by subjecting pistons 43, 46 to additional hydraulic or pneumatic pressure, respectively, to counteract the extension motion. As can further be seen from FIG. 2, the actuating cylinder 4 is provided with rollers 49 which are in engagement with an associated guide rail 50 mounted to afterburner jet pipe 3. To the lower wall section 17 of each nozzle flap 14, heat shield segments 51, as shown in FIG. 2, are located immediately downstream of heat shield rings 25' of the afterburner jet pipe 3 with the thrust reversing device in the inoperative position in FIG. 1 so that the heat shield can also be cooled by compressor bleed air during afterburner operation. Thus, the nozzle flaps 14 and consequently the devices passing through them for actuating the flaps 24 can be protected from the high temperatures resulting from afterburner operation.

While I have shown and described an embodiment in accordance with the present invention, it is to be clearly understood that the same is susceptible of numerous changes and modifications as are encompassed by the scope of the present invention. I, therefore, do not wish to be limited to the details shown and described herein, but intend to cover all such changes and modifications as are encompassed by the scope of the present invention.

I claim:

1. A thrust reversing arrangement for a turbojet engine of the type having a stationary afterburner jet pipe arranged inside of an engine fairing and a variable area thrust nozzle positioned adjacent the downstream end of the jet pipe; said arrangement comprising:
   trust nozzle control means for varying the area of the thrust nozzle by pivotally moving thrust nozzle flaps during operation of the engine,
   thrust reverser actuating cylinder means arranged around said jet pipe, said cylinder means including thrust reverser vane cascade means,
   cylinder translating means for translating said cylinder means from a position corresponding to normal engine operation with the cascade means between the fairing and the jet pipe to a position corresponding to thrust reversal operation of the engine with the cascade means out of the fairing over the downstream end of the jet pipe, and
   thrust reverser flap means for shutting off the gas efflux of the engine and directing the same to the cascade means during thrust reversal operation of the engine,
   said thrust nozzle control means including an actuating skirt having a section tapering in the downstream direction approximately at an angle corresponding to the contour of the engine fairing, said skirt being movable in recesses provided in the thrust nozzle flaps, said skirt having inner sliding faces engageable with corresponding faces in said recesses for effecting movement of said thrust nozzle flaps in response to movement of said skirt, the sliding faces of said recesses being inclined inwardly at an angle greater than the faces of the actuating skirt at least in the area of said skirt and recesses corresponding to the position of minimum thrust nozzle gas outlet area.

2. An arrangement according to claim 1, wherein the actuating cylinder means has an end section tapering in accordance with the engine fairing contour between the engine fairing and the actuating skirt with the thrust reversing device in the inoperative position, and wherein the skirt is extendable from the actuating cylinder means for an increase of the thrust nozzle gas outlet area.

3. An arrangement according to claim 2, wherein the thrust reverser flap means are pivotable about transverse axes on the variable thrust nozzle for at least substantially shutting-off horizontal gas efflux and for forming the divergent inner section of the variable thrust nozzle when the thrust reversing device is in the inoperative position.

4. An arrangement according to claim 3, wherein roller means are operatively mounted at the afterburner jet pipe for movement of the actuating cylinder means.

5. An arrangement according to claim 2, wherein roller means are operatively mounted at the afterburner jet pipe for movement of the actuating cylinder means.

6. An arrangement according to claim 5, wherein the actuating means includes at least one device comprising a support operatively connected with the actuating cylinder means and carrying a pair of pivotally mounted bellcrank levers following stationary guideways inclined relative to each other, roller means mounted at one end of the bellcrank levers, a second pair of levers operatively mounted at the other end of the bellcrank levers, a common connecting link operatively connected with the second pair of levers and a rod, and an actuating ring being connected with the rod for actuating the flaps.

7. An arrangement according to claim 6, wherein actuating rods are operatively connected between the actuating ring and the flaps, and the actuating rods and actuating ring are located below lower wall sections of the nozzle flaps and protected by heat shield segments, the actuating skirt and the upper wall sections of the nozzle flaps.

8. A thrust reversing arrangement for a turbojet engine of the type having a stationary afterburner jet pipe arranged inside of an engine fairing and a variable area thrust nozzle positioned adjacent the downstream end of the jet pipe; said arrangement comprising:
   thrust nozzle control means for varying the area of the thrust nozzle by pivotally moving thrust nozzle flaps during operation of the engine,
   thrust reverser actuating cylinder means arranged around said jet pipe, said cylinder means including thrust reverser vane cascade means,
   cylinder translating means for translating said cylinder means from a position corresponding to normal engine operation with the cascade means between the fairing and the jet pipe to a position corresponding to thrust reversal operation of the engine with the cascade means out of the fairing over the downstream end of the jet pipe,
   thrust reverser flap means for shutting off the gas efflux of the engine and directing the same to the cascade means during thrust reversal operation of the engine,
   said thrust reverser flap means being pivotable about transverse axes on the variable thrust nozzle for at least substantially shutting off horizontal gas efflux, said thrust reverser flap means forming the inner divergent section of the thrust nozzle during normal operation of the engine, and
   thrust reverser flap actuating means for actuating the movement of the thrust reverser flaps upon axial movement of the actuating cylinder means in such a manner that, with a progressive movement of the vane cascade means out of the fairing, the thrust reverser flap means progressively decreases the thrust nozzle gas outlet area,
   said reverser flap actuating means including at least one device comprising:
   a support operatively connected with the actuating cylinder means and carrying a pair of pivotally mounted bellcrank levers following stationary guideways inclined relative to each other, roller means mounted at one end of the bellcrank levers, a second pair of levers operatively mounted at the other end of the bellcrank levers, a common connecting link operatively connected with the second pair of levers and a rod, and an actuating ring being connected with the rod for actuating the flaps.

9. An arrangement according to claim 8, wherein the guideways are straight.

10. An arrangement according to claim 9, wherein said thrust nozzle control means includes an actuating skirt having a section tapering in the downstream direction approximately at an angle corresponding to the contour of the engine fairing, said skirt being movable in recesses provided in the thrust nozzle flaps, said skirt having inner sliding faces engageable with corresponding faces in said recesses for effecting movement of said thrust nozzle flaps in response to movement of said skirt, the sliding faces of said recesses being inclined inwardly at an angle greater than the faces of the actuating skirt at least in the area of said skirt and recesses corresponding to the position of minimum thrust nozzle gas outlet area, and wherein the actuating cylinder means has an end section tapering in accordance with the engine fairing contour between the engine fairing and the actuating skirt with the thrust reversing device in the inoperative position, the skirt being extendable from the actuating cylinder means for an increase of the thrust nozzle gas outlet area.

11. An arrangement according to claim 8, wherein the guideways are curved.

12. An arrangement according to claim 8, wherein roller means are operatively mounted at the afterburner jet pipe for movement of the actuating cylinder means.

13. A thrust reversing arrangement for a turbojet engine of the type having a stationary after burner jet pipe arranged inside of an engine fairing and a variable area thrust nozzle positioned adjacent the downstream end of the jet pipe; said arrangement comprising:
   thrust nozzle control means for varying the area of the thrust nozzle during operation of the engine,
   thrust reverser actuating cylinder means arranged around said jet pipe, said cylinder means including thrust reversing vane cascade means,
   cylinder translating means for translating said cylinder means from a position corresponding to normal engine operation without thrust reversal with the cascade means between the fairing and the jet pipe to a position corresponding to thrust reversal operation of the engine with the cascade means out of the fairing over the downstream end of the jet pipe,
   thrust reverser flaps pivotally mounted to the thrust nozzle for movement from a first position corresponding to normal engine operation in recesses within the downstream end of said thrust nozzle to a second position corresponding to thrust reversal operation of the engine out of said recesses and into substantial blocking relationship to the engine exhaust gas flow through the thrust nozzle, said thrust reverser flaps forming a divergent inner section of the thrust nozzle when in said first position, said thrust reverser flaps together with an inner convergent section of the thrust nozzle being operative to deflect the exhaust flow in the direction of said cascade means when in said second position, and means for moving said thrust reverser flaps between said first and second positions.

14. An arrangement according to claim 13, wherein said thrust nozzle control means includes means for varying the area of the thrust nozzle independently of the position of the actuating cylinder means.

15. An arrangement according to claim 14, wherein said thrust nozzle is adjusted to a minimum cross-section opening during thrust reversal operation of the engine.

16. An arrangement according to claim 13, wherein said thrust reverser flaps merge with the extreme downstream end of said thrust nozzle when in said first position.

17. An arrangement according to claim 13, wherein said thrust nozzle comprises a plurality of circumferentially spaced pivotable thrust nozzle flaps, and wherein a thrust reverser flap is pivotally connected to each one of said thrust nozzle flaps.

18. An arrangement according to claim 13, wherein said actuating cylinder means includes a downstream extension which forms a continuous outer smooth aerodynamic surface with said fairing when in the position corresponding to normal engine operation.

19. An arrangement according to claim 13, wherein said thrust nozzle control means includes an axially linearly movable annularly shaped skirt means arranged radially inwardly of said actuating cylinder means, said skirt means having a sliding cam surface means engageable with corresponding cam surface means on said thrust nozzle to vary the opening of said thrust nozzle in response to linear movement of said skirt means.

20. An arrangement according to claim 19, wherein said thrust nozzle control means includes means for moving said skirt means while said actuating cylinder remains in a fixed position.

21. An arrangement according to claim 19, wherein said actuating cylinder means includes a downstream extension, and wherein the downstream end of said extension forms a continuous outer smooth aerodynamic surface with an outer surface of said skirt means when in the position corresponding to thrust reversal engine operation.

22. An arrangement according to claim 19, wherein said thrust nozzle is adjusted to a minimum cross-section opening during thrust reversal operation of the engine.

23. An arrangement according to claim 17, wherein said thrust reverser flaps merge with the extreme downstream end of said thrust nozzle when in said first position.

24. An arrangement according to claim 23, wherein the upstream end of said thrust reverser flaps forms the transition between the converging and diverging sections of the thrust nozzle flaps.

25. An arrangement according to claim 13, wherein said thrust nozzle control means includes means for varying the thrust nozzle through all adjustable positions without pivotally moving said thrust reverser flaps with respect to said thrust nozzle structure.

* * * * *